United States Patent
Prasad et al.

(10) Patent No.: US 12,546,648 B2
(45) Date of Patent: Feb. 10, 2026

(54) DISTRIBUTED OPTICAL FIBER SENSING (DFOS) SYSTEM AND METHOD OF USING THE SAME

(71) Applicant: NEC Corporation, Tokyo (JP)

(72) Inventors: Hemant Shivsagar Prasad, Tokyo (JP); Daisuke Ikefuji, Tokyo (JP); Tomoyuki Hino, Tokyo (JP)

(73) Assignee: NEC Corporation, Tokyo (JP)

( * ) Notice: Subject to any disclaimer, the term of this patent is extended or adjusted under 35 U.S.C. 154(b) by 76 days.

(21) Appl. No.: 18/537,669

(22) Filed: Dec. 12, 2023

(65) Prior Publication Data

US 2025/0189364 A1 Jun. 12, 2025

(51) Int. Cl.
*G01H 9/00* (2006.01)
*G08G 1/04* (2006.01)

(52) U.S. Cl.
CPC ............ *G01H 9/004* (2013.01); *G08G 1/04* (2013.01)

(58) Field of Classification Search
None
See application file for complete search history.

(56) References Cited

U.S. PATENT DOCUMENTS

| | | | |
|---|---|---|---|
| 12,025,477 B2 * | 7/2024 | Hino | G01D 5/35358 |
| 2016/0275788 A1 | 9/2016 | Wu et al. | |
| 2020/0124735 A1 * | 4/2020 | Huang | G01H 9/004 |
| 2020/0279217 A1 * | 9/2020 | Gravelle | B65G 1/1373 |
| 2020/0313763 A1 * | 10/2020 | Wang | H04B 10/25753 |
| 2020/0401784 A1 * | 12/2020 | Salemi | G06F 18/243 |
| 2021/0024063 A1 * | 1/2021 | Luo | B60W 30/095 |
| 2021/0294352 A1 * | 9/2021 | Kessler | G08G 1/0145 |
| 2021/0312801 A1 * | 10/2021 | Ji | G06T 5/94 |
| 2022/0375338 A1 | 11/2022 | Narisetty et al. | |
| 2024/0302229 A1 * | 9/2024 | Lindsey | G01D 5/35361 |

FOREIGN PATENT DOCUMENTS

| | | |
|---|---|---|
| EP | 3892963 A1 | 10/2021 |
| JP | 2021512309 A | 5/2021 |
| JP | 2022172224 A | 11/2022 |
| JP | 2023511875 A | 3/2023 |
| WO | 2017072505 A1 | 5/2017 |
| WO | 2017093715 A1 | 6/2017 |

OTHER PUBLICATIONS

Office Action in JP Application No. 2024-215939, mailed Dec. 2, 2025, 12pp.

* cited by examiner

*Primary Examiner* — Truc M Do
(74) *Attorney, Agent, or Firm* — HAUPTMAN HAM, LLP

(57) ABSTRACT

A vehicle tracking method includes receiving distributed optical fiber sensing (DFOS) data. The method further includes identifying first hit points within the DFOS data, wherein each of the first hit points corresponds to a location of a corresponding first vehicle at a detection time. The method further includes determining an initial seed point from among the identified first hit points. The method further includes determining whether any of the identified first hit points is an outlier hit point. The method further includes clustering the identified first hit points exclusive of any outlier hit point to define a first cluster. The method further includes estimating a first vehicle parameter of the first vehicle based on the first cluster.

18 Claims, 12 Drawing Sheets

DISTRIBUTED OPTICAL FIBER SENSING (DFOS) SYSTEM AND METHOD OF USING THE SAME

BACKGROUND

Optical fibers are present along numerous roadways. Distributed acoustic sensors (DASs) attached to these optical fibers are able to detect vibrations where the optical fibers are located. In some instances, these vibrations are the result of passing vehicles. DASs are able to collect data related to a number of vehicles, lane location of vehicles and vehicle speed.

DASs generate waterfall data based on time and distance in order to determine traffic parameters. An ability of DASs to detect individual vehicles is related to an amount of noise in a signal detected by the DAS.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
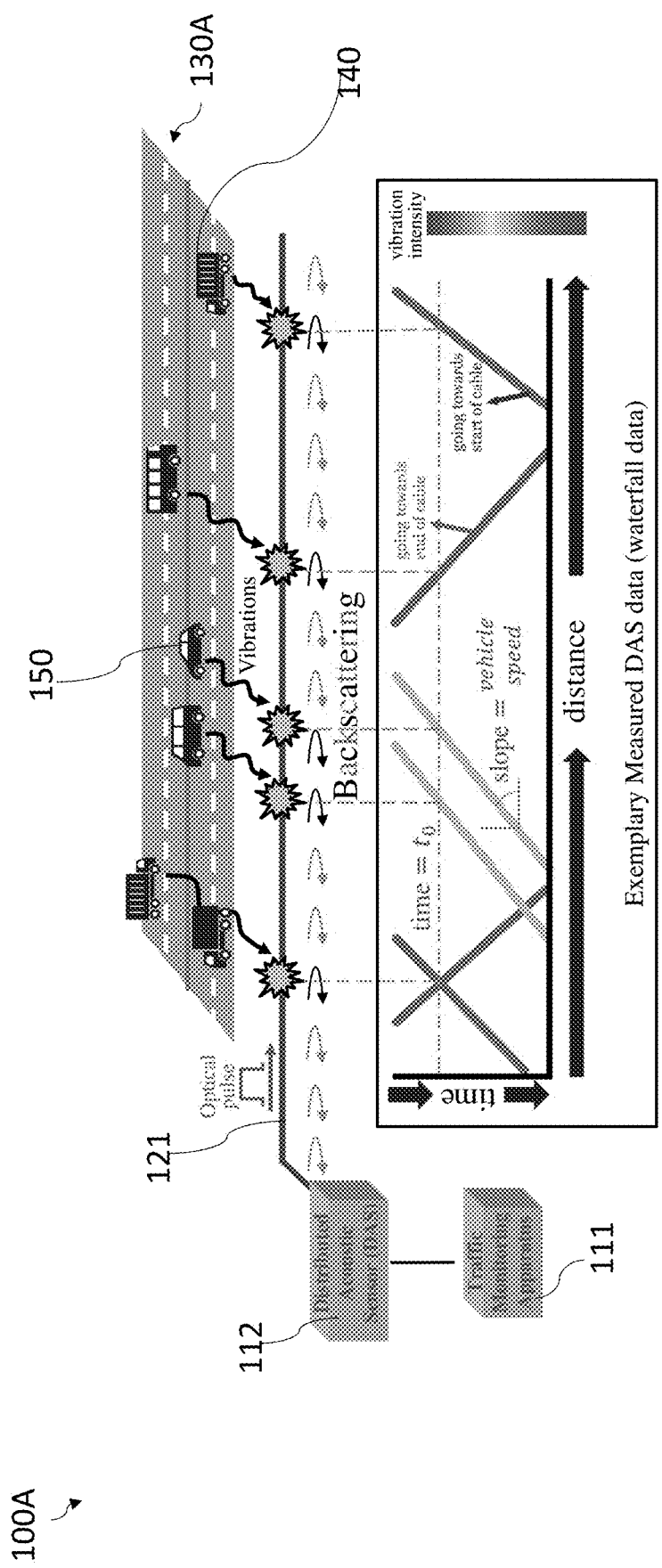
FIG. 1A is a schematic view of a distributed acoustic sensor (DAS) system along a roadway in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Utilizing data from optical fibers along roadways is useful for determining traffic volume, traffic speed, accidents and other events along roadways. In order to increase usefulness of traffic information obtained based on data from optical fibers, determination of vehicle parameters, such as speed, acceleration, lane position, etc., provides information useful for identifying traffic patterns and navigation information. A quality of distributed fiber optic sensing (DFOS) data collected is determined by numerous factors. Since the DFOS data is based, at least in part, on vibrations, a size of a vehicle, an amount of traffic, as well as a type of roadway impact the quality of the data. For example, a single vehicle traveling along a roadway which is directly on the ground is likely to provide a higher quality signal than a large truck traveling over a bridge with high traffic volume. De-noising of the DFOS data is helpful in analyzing the DFOS data in order to use the DFOS data for applications such as traffic analysis, autonomous driving, navigation direction, etc.

Additionally, precision of traffic information assists with navigation of a vehicle traveling along the roadway. By providing drivers with more accurate traffic data, navigation systems and/or navigation applications become more useful to the drivers. Increased precision navigation is also useful for autonomous driving or driver assist functionalities for vehicles. Determining precisely where traffic congestion or a traffic accident has occurred, an autonomous driving vehicle or driver assist system is able to direct a vehicle along a more efficient path.

The current application describes a method and a system for improving vehicle tracking along a roadway using DFOS data. Detection locations, also called hit points, for objects along the roadway using DFOS data allows determination of a location of a vehicle along the roadway at various times. Using thresholding techniques helps to remove erroneous data, also called outlier hit points, from the DFOS data utilized to track the vehicle. As a result, precision and accuracy in vehicle tracking is improved in comparison with other approaches. Clustering of hit points also helps to provide vehicle data, such as speed, to further improve usefulness of DFOS data both for vehicle tracking and traffic congestion analysis.

In addition, the increased accuracy and precision of vehicle tracking described in this application helps to facilitate tracking of multiple vehicles along a same roadway even when the DFOS data for multiple vehicles includes an intersection. Utilizing thresholding and clustering, the current application provides an approach for accurately tracking multiple vehicles by utilizing vehicle data, such as speed, to accurately determine a path of each of the multiple vehicles even through an intersection of the DFOS data. An intersection of the DFOS data is where hit points for each of the multiple vehicle cross one another on a plot of distance versus time. The intersection of the DFOS data is not indicative of an intersection within a roadway.

FIG. 1A is a schematic view of a distributed acoustic sensor (DAS) system 100A along a roadway 130A in accordance with some embodiments. DAS system 100A includes a traffic monitoring apparatus 111 in communication with a DAS 112. DAS system 100A further includes an optical fiber 121 connected to DAS 112. Optical fiber 121 is along roadway 130A. Roadway 130A includes three lanes. Numerous vehicles are on roadway 130A. Some vehicles 140 on roadway 130A are larger than other vehicles 150 on roadway 130A. While the description refers to an optical fiber 121, one of ordinary skill in the art would understand that the optical fiber 121 includes a multi-fiber bundle in some embodiments.

As vehicles 140 and 150 pass along roadway 130A the vehicles generate vibrations. These vibrations change a manner in which light propagates along optical fiber 121. DAS 112 is connected to optical fiber 121 and sends an optical signal down optical fiber 121 and detects the returned light from optical fiber 121. The resulting data is called waterfall data. The waterfall data provides information related to a number of vehicles, directionality of travel by the vehicles, vehicle speed and lane location of the vehicles on roadway 130A.

Figure 1B:
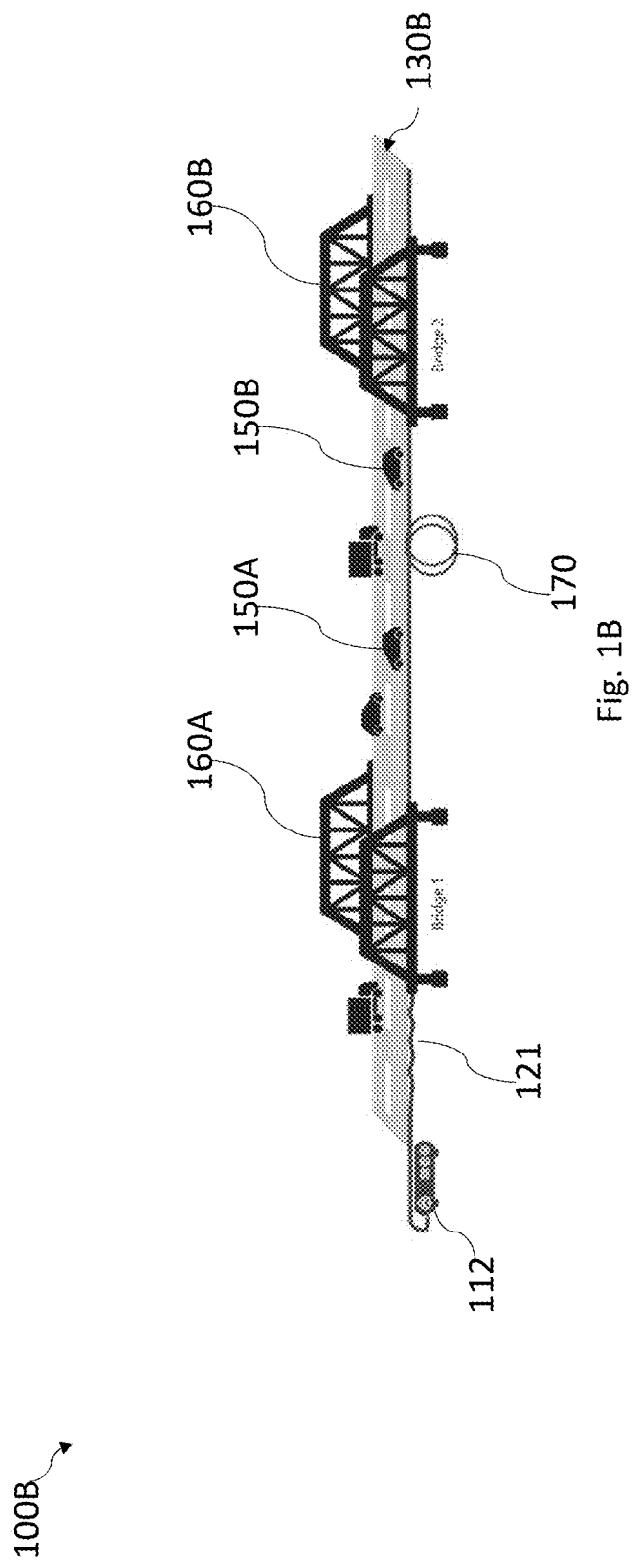
FIG. 1B is a schematic view of a distributed acoustic sensor (DAS) system along a roadway in accordance with some embodiments.

Roadway 130A in FIG. 1 is on solid ground. Solid ground does not vibrate at a sufficiently high amplitude to obscure detection of vehicles 140 and 150 on traveling along roadway 130A. As a result, DAS 112 is able to precisely detect vehicles 140 and 150 traveling along roadway 130A. In some embodiments, roadway 130A includes at least one bridge, such as roadway 130B in FIG. 1B.

Unlike solid ground, bridges exhibit different vibration characteristics, such as dampening. The vibration characteristics of bridges are impacted by bridge length, construction material of the bridge, wind and other factors. These differences in vibration characteristics of bridges are able to be utilized to determine where along the optical fiber 121 bridges are located.

FIG. 1A also includes exemplary measured DAS data. This exemplary measured DAS data is provided to assist in the understanding of waterfall data collected by DAS 112.

FIG. 1B is a schematic view of a DAS system 100B along a roadway 130B in accordance with some embodiments. Similar to the DAS system 100A in FIG. 1A, the DAS system 100B includes DAS 112 and optical fiber 121. In contrast to FIG. 1A, the roadway 130B in FIG. 1B includes a first bridge 160A and a second bridge 160B. Additionally, the FIG. 1B includes extra fiber portion 170.

Considering a first vehicle 150A and a second vehicle 150B helps in understanding the use of fixed reference points, such as the first bridge 160A and the second bridge 160B in precisely determining locations corresponding to traffic information. A distance between the first vehicle 150A and the second vehicle 150B along the roadway 130B is significantly different than a length of the optical fiber 121 between the location of the first vehicle 150A and the second vehicle 150B. This difference is due to the presence of extra fiber portion 170, as well as optical fiber 121 not being exactly parallel to the roadway 130B. Determining a location of the first bridge 160A along the optical fiber 121 helps to determine a precise location of the first vehicle 150A along the roadway 130B. A location of the first bridge 160A along the roadway 130B is known based on publicly available geographic data. By determining the position of the first bridge 160A relative to the optical fiber 121, a length of the optical fiber 121 from the DAS 112 to an end of the first bridge 160A closest to the first vehicle 150A is determined based on the waterfall data. Next, a length of the optical fiber 121 between the end of the first bridge 160A to the first vehicle 150A is determined based on the waterfall data. By limiting a distance of the optical fiber 121 from the fixed reference point of the first bridge 160A to the first vehicle 150A, errors between the length of the roadway 130 from the end of the first bridge 160A to the DAS 112 are excluded from the location determination. As a result, the location of the first vehicle 150A along the roadway 130B is able to be more precisely determined using the fixed reference point of the first bridge 160A.

Similarly, the location of the second vehicle 150B is more precisely determined by using the fixed reference point of the second bridge 160B. The waterfall data from DAS 112 is usable to determine the length of the optical fiber 121 between the DAS 112 and end of the second bridge 160B closest to the second vehicle 150B. Then, only the length of optical fiber 121 between the second vehicle 150B and the second bridge 160B is used to determine the location of the second vehicle 150B along the roadway 130B. Using this shorter length of optical fiber 121 excludes the length of the optical fiber 121 between the second vehicle 150B and the DAS 112, including the extra fiber portion 170, from the location determination. As a result, the location of the second vehicle 150B is more precisely determined by using the fixed reference point of the second bridge 160B.

Figure 2:
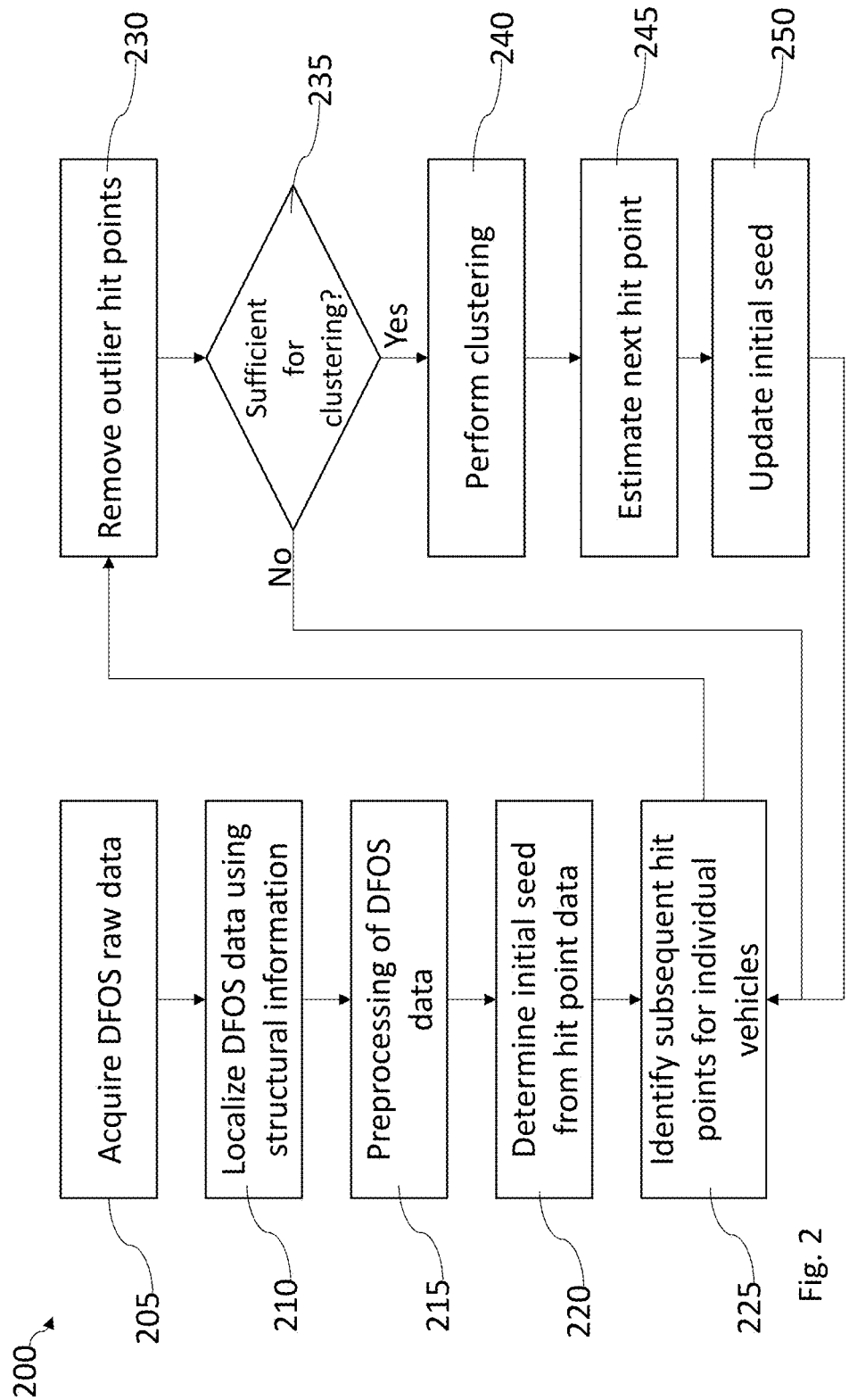
FIG. 2 is a flowchart of a method of analyzing data from distributed fiber optic sensing (DFOS) data in accordance with some embodiments.

FIG. 2 is a flowchart of a method of analyzing data from distributed fiber optic sensing (DFOS) data in accordance with some embodiments. The method 200 is usable with the DAS system 100A (FIG. 1A), the DAS system 100B (FIG. 1B), or another suitable system that provides DFOS data.

In operation 205, raw DFOS data is received. In some embodiments, the raw DFOS data includes waterfall data, e.g., waterfall data detected by DAS 112 (FIG. 1). Waterfall data includes information related to time and location along the optical fiber at which vibration data is detected. Further details of the waterfall data are discussed with respect to FIG. 3 below. In some embodiments, the waterfall data includes data along a roadway including both solid ground and at least one bridge.

In operation 210, the raw DFOS data is localized using structural information. The structural information includes information obtained from an external source with respect to fixed reference points along the roadway. For example, in some embodiments, the structural information includes a location of a bridge, e.g., bridge 160A (FIG. 1B), a location of extra fiber, e.g., extra fiber 170 (FIG. 1B), or other suitable reference points along the roadway. Localizing the DFOS data using structural information helps to improve the accuracy and precision of the position of a detected vehicle as well as accurate determination of vehicle parameters, such as speed, acceleration, etc. The localization of the DFOS data also helps to improve accuracy and precision of navigation instructions, autonomous driving functionality, traffic monitoring, or other suitable applications of the DFOS data.

In operation 215, the raw DFOS data is preprocessed in order to enhance the received data. Preprocessing the data includes normalizing vibration amplitude of the data at each position along a roadway, e.g., roadway 130B (FIG. 1B), across a predetermined time duration. Normalizing the vibration amplitude helps to account for variations in sensitivity of the optical fiber. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. By normalizing the vibration amplitude based on a predetermined time duration, an effect of the large magnitude vibrations detected during high traffic conditions on time periods with low traffic conditions is reduced producing more precise data for estimating traffic flow properties.

In some embodiments, preprocessing the data also limits a maximum vibration amplitude at each position along the optical fiber for the predetermined time duration. Limiting the maximum vibration amplitude helps to prevent vibrations from large vehicles, such as trucks or construction vehicles, from obscuring vibrations generated by smaller vehicles, such as passenger automobiles.

Figure 4:
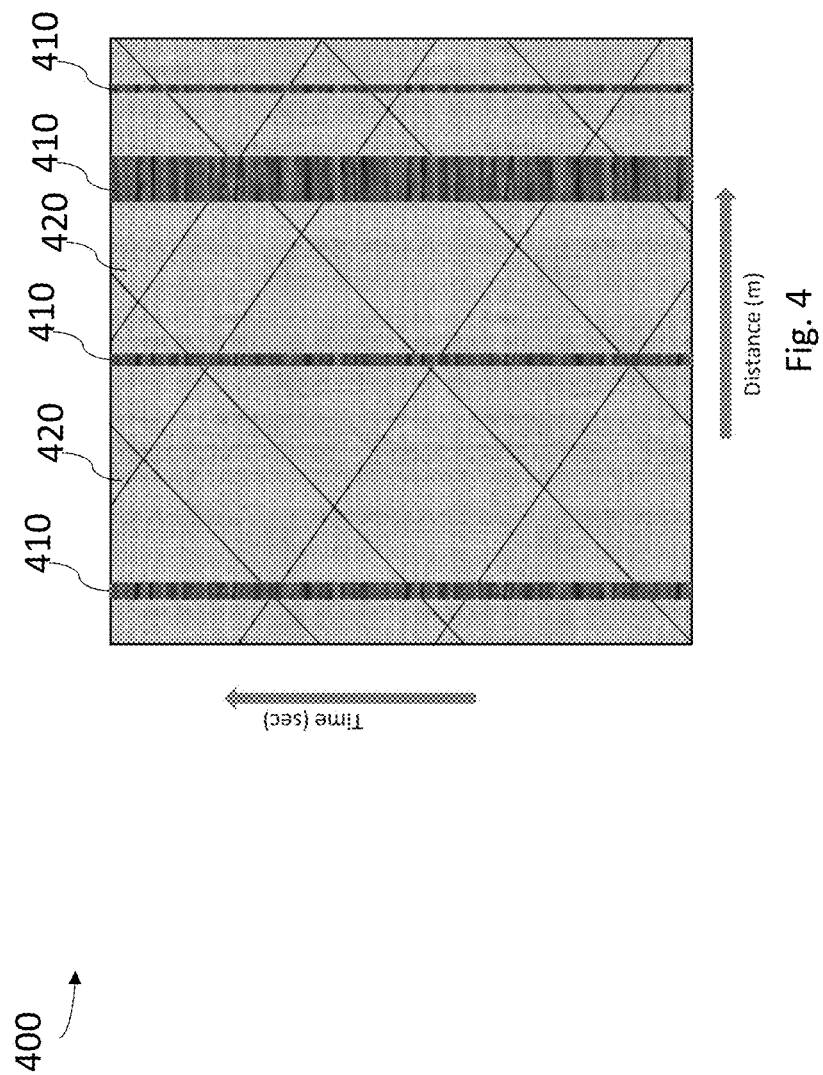
FIG. 4 is a view filtered DFOS data in accordance with some embodiments.

The preprocessed data is then filtered by a band pass filter based on the estimated frequency range from operation 210. Filtering of the data excludes portions of the roadway from the data that fail to exhibit the vibration dampening characteristics of bridges. FIG. 4 below provides an example of filtered DFOS data.

In operation 220, an initial seed is determined for each vehicle based on hit point data. The initial seed for each vehicle is determined based on a hit point identified at a first time, e.g., time (t)=0, that a vehicle is detected. In some embodiments, the first time is the time at which the vehicle first enters a detection area for the DAS system, e.g., DAS system 100A (FIG. 1A), DAS system 100B (FIG. 1B), or another suitable DAS system. In some embodiments, the first time is a time selected by a user of the DAS system. The hit points are identified based on detected vibrations in the DFOS data. The detected vibrations are determined based on a width of a line in the DFOS data. In some instances, the vibrations generate a wider, indicating higher vibration intensity. The wider line has an increased risk of resulting in multiple hit points being identified for a same vehicle. Additionally, in some embodiments, additional vibrations not caused by a vehicle traveling along the roadway will generate vibrations detected in the DFOS data. These additional vibrations potentially result in erroneous hit points being identified where no vehicle exists.

In some embodiments, a trained neural network (NN) is utilized to identify the hit points within the DFOS data. In some embodiments, the hit points are identified or verified by a user of the DAS system. The identification of the initial hit points assists with tracking of a vehicle through at least a portion of a detection area of the DAS system in order to determine vehicle parameters for use in autonomous driving, navigation instructions, traffic monitoring or other suitable applications. Additional details with respect to detecting initial hit points are provided with respect to FIG. 5 below, in accordance with some embodiments.

In operation 225, subsequent hit points are identified for individual vehicles. The subsequent hit points are vehicle locations determined using the DFOS data at times after the first time, e.g., t=1, t=2, etc. In some embodiments, an interval between the first time and the subsequent times is uniform across each of the times. In some embodiments, an irregular interval exists between the first time and the subsequent times. In some embodiments, the interval is predetermined. In some embodiments, the interval is set based on a speed limit along the roadway. In some embodiments, the interval is set based on expected traffic along the roadway, e.g., shorter intervals for higher traffic congestion areas. In some embodiments, the subsequent hit points are identified in a same manner as the initial hit point. In some embodiments, in addition to detecting vibrations based on the DFOS data the subsequent hit points are identified based on a number of initial hit points, which are usable to predict a number of vehicles to be tracked through the detection area of the DAS system. In some embodiments, in addition to detecting vibrations based on the DFOS data the subsequent hit points are identified based on an expected location of the vehicle. In some embodiments, a trained NN is usable to identify the subsequent hit points. Additional details with respect to detecting initial hit points are provided with respect to FIG. 5 below, in accordance with some embodiments.

In operation 230, outlier hit points are removed. An outlier hit point is a hit point within the DFOS data that cannot reasonably correspond to a tracked vehicle. For example, a hit point that is 100 meters (m) away from a hit point detected 0.5 seconds(s) previously would be considered an outlier hit point because the vehicle would have to travel at 200 meters/second (m/s), which is 720 kilometers/hour (km/h) or 447 miles/hour (mph). Such a travel speed is not reasonable, even assuming that the vehicle is capable of traveling at such speeds. In some embodiments, determining whether a potential outlier hit point could reasonably correspond to a tracked vehicle is based on a speed limit along the roadway being monitored by the DAS. In some embodiments, determining whether potential outlier hit point could reasonably correspond to the tracked vehicle is based on a previously determined speed of the vehicle. For example, in some embodiments, if a difference in speed necessary for the vehicle to reach the potential outlier hit point and a previously determined speed of the vehicle is greater than 50% of the previously determined speed of the vehicle, then the hit point is determined to be an outlier hit point. In some embodiments, determining whether the potential outlier hit point could reasonably correspond to the track vehicle is based on a direction of travel of the vehicle. For example, if the potential outlier hit point would indicate that the vehicle rapidly changed directions multiple times, then the potential outlier hit point is less likely to reasonably correspond to the tracked vehicle. In some embodiments, a trained neural network (NN) is utilized to identify outlier hit points within the DFOS data. In some embodiments, NN is trained using traffic congestion and/or vehicle tracking data along the same roadway or along a similar roadway. Utilizing the traffic congestion and/or vehicle tracking data as training data allows the NN to determine how vehicle frequently travel along the roadway in order to determine whether the potential outlier hit point could reasonably correspond to the tracked vehicle.

In some instances, the outlier hit points are a result of high winds, construction, traffic accidents, or other such occurrences that result in the DAS detecting a vibration along the roadway other than movement of a tracked vehicle.

Once a hit point is identified as an outlier hit point, the hit point is no longer considered during vehicle tracking or traffic congestion analysis using the DFOS data. In some embodiments, the outlier hit points are deleted from the DFOS data. In some embodiments, the outlier hit points are utilized to train a NN to better identify outlier hit points during analysis of future DFOS data.

In operation 235, a determination is made regarding whether a sufficient number of hit points are identified for performing a clustering operation. Clustering hit points permits determination of vehicle parameters, such as speed along the roadway. As a number of hit points in a cluster increases, accuracy of the determined vehicle parameters increases. However, a greater number of hit points within the cluster consumes a longer period of time to collect the greater number of hit points. As a result, the determination of a sufficient number of hit points is able to be tailored based on a use of the DFOS data. In some embodiments, the number of hit points sufficient for clustering is a fixed value. In some embodiments, the number of hit points sufficient for clustering varies based on vehicle or roadway conditions. For example, in a situation where near real time data is desired, such as autonomous driving, a small number of hit points, such as two or three hit points, would be determined sufficient for clustering, in some embodiments.

In some embodiments, the determination of the number of hit points sufficient for clustering is based on detected traffic congestion. As traffic congestion increases, vehicle speed decreases. As a result, the number of hit points considered sufficient for clustering would increase during high traffic congestion. For example, in some embodiments where the DFOS data is utilized in vehicle navigation, such as a vehicle global position system (GPS), increasing the number hit points sufficient for clustering would permit collection of more data to provide a more accurate result without increasing a risk of the vehicle traveling past a location, such as an exit ramp or a turn, due to the slower speed of the vehicle.

In some embodiments, the determination of the number of hit points sufficient for clustering is based on a previously determined speed of the vehicle. As a speed of the vehicle increases, a number of hit points considered sufficient for clustering decreases. For example, in some embodiments where the DFOS data is utilized in vehicle navigation decreasing the number hit points sufficient for clustering would reduce a risk of the vehicle traveling past a location due to the greater speed of the vehicle.

In some embodiments, the determination of the number of hit points sufficient for clustering is based on a threshold determined by an operator of the DAS. In some embodiments, the threshold corresponds to 10 seconds(s) worth of hit points. In some embodiments, the threshold is based on empirical data for travel along a monitored roadway.

In response to a determination that an insufficient number of hit points for clustering is identified, the method 200 returns to operation 225 and additional hit points are identified. In response to a determination that a sufficient number of hit points for clustering is identified, the method 200 proceeds to operation 240.

In operation 240, clustering is performed on the identified hit points. In some embodiments, the hit points are clustered using K-means clustering, where the number of identified hit points determined in operation 235 is used as the value for K. In some embodiments, the clustering is performed density-based spatial clustering of applications with noise (DB-SCAN) clustering, Gaussian Mixture Model clustering, balanced iterative reducing and clustering using hierarchies (BIRCH) clustering, affinity propagation clustering, mean-shift clustering, ordering points to identify the clustering structure (OPTICS) clustering, agglomerative hierarchy clustering, or another suitable type of clustering.

In operation 245, a next hit point is estimated based on the clustered hit points. An expected position of the next hit point is estimated based on a vehicle parameter, such as speed, determined based on the clustered hit points. For example, in some embodiments where DFOS data is captured at a regular time interval, the speed of the vehicle and the regular time interval are usable to estimate a location where a hit point is expected to be found. In some embodiments, any detected hit point other than an outlier hit point is determined to be a match between the estimated hit point and the detected hit point. In response to detection of a hit point at the estimated position, the hit point is usable to update the vehicle parameter determined based on the clustered hit points from operation 240. In response to a failure to detect a hit point at the estimated position, a subsequent hit point is estimated and the operation 245 is repeated to attempt to detect a hit point at the estimated subsequent hit point. The subsequent hit point is a hit point at least one detection period later than the next hit point initially sought in operation 245.

In some embodiments, the operation 245 is repeated iteratively until a hit point is detected at a position where an estimated hit point is expected. In some embodiments, a maximum number of iterations is permitted prior to proceeding to operation 250. That is, if no match is found between a detected hit point and an estimated hit point within the maximum number of iterations, the method 200 proceeds to operation 250. In some embodiments, the maximum number of iterations is set by an operator of the DAS. In some embodiments, the maximum number of iterations is based on a speed of the vehicle. As a number speed of the vehicle increases, the maximum number of iterations decreases. In some embodiments, the maximum number of iterations is determined based on the user of the DFOS data. For example, autonomous driving has a lower number of maximum iterations than traffic congestion analysis, in some embodiments. In some embodiments, the maximum number of iterations ranges from 2 to 10. Estimating the hit points helps to improve precision in vehicle tracking by reducing the risk of relying on hit point data that is erroneous, but not to a degree to be identified as an outlier hit point.

In operation 250, the initial seed is updated to a new hit point. In some embodiments, the initial seed corresponds to the estimated hit point determined in operation 245. In some embodiments, the initial seed corresponds to a latest hit point within the clustered hit points from operation 240. In some embodiments, the initial seed corresponds to a first detected hit point later than the clustered hit points from operation 240. Utilizing a latest hit point within the clustered hit points increases an accuracy of the method 200 in tracking the vehicle or traffic congestion analysis. Utilizing a hit point later than the clustered hit points increases a speed of processing for tracking the vehicle or performing traffic congestion analysis.

Following operation 250, the method 200 returns to operation 225 and further vehicle tracking is performed.

In some embodiments, the method 200 includes additional operations. For example, in some embodiments, the method 200 includes generating instructions for controlling an autonomously driven vehicle based on the estimated vehicle parameter. In some embodiments, at least one operation of the method 200 is omitted. For example, in some embodiments, the operation 245 is omitted and no estimation of hit points is performed. In some embodiments, an order of operations of the method 200 is adjusted. For example, in some embodiments, the operation 215 is performed prior to the operation 210.

Using the method 200, the DFOS data is usable to increase precision and accuracy of tracking a vehicle along a roadway in comparison with other approaches that fail to remove outlier hit points and cluster hit points. The improved determination of vehicle tracking helps to improve the accuracy of traffic monitoring, navigation instructions, autonomous driving instructions and other applications.

Figure 3:
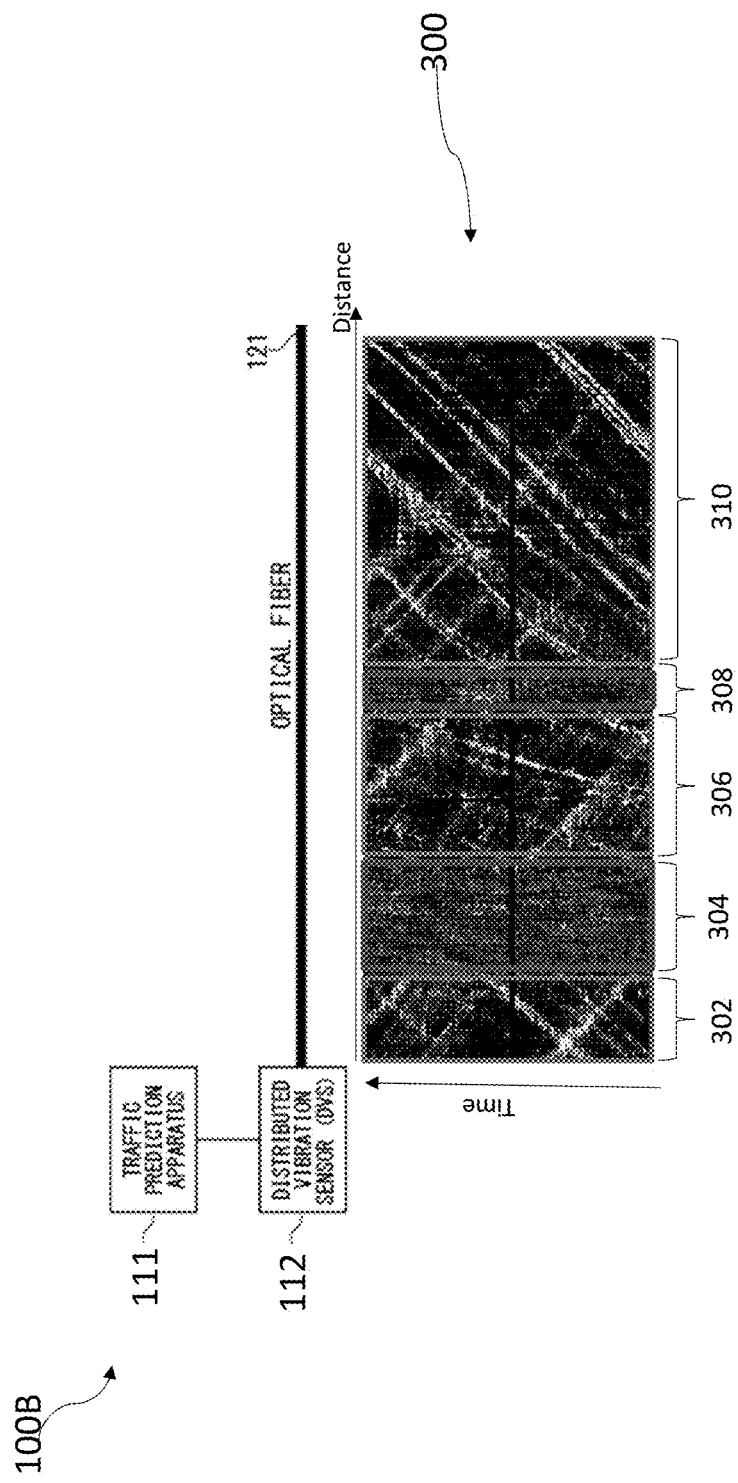
FIG. 3 is a schematic view of a DAS system along with waterfall data collected by the DAS system in accordance with some embodiments.

FIG. 3 is a schematic view of a DAS system 100B along with waterfall data 300 collected by the DAS system in accordance with some embodiments. DAS system 100B is the same as DAS system 100B in FIG. 1B. Similar to FIG. 1B, the roadway (not shown) in FIG. 3 includes two bridges, as indicated by waterfall data 300. Waterfall data 300 is preprocessed waterfall data.

Waterfall data 300 includes regions 302, 304, 306, 308 and 310. Regions 302, 306 and 310 include discernable lines indicating vibrations produced by vehicles traversing the roadway. Regions 304 and 308 indicate bridges. In comparison with regions 302, 306 and 310, regions 304 and 308 include no discernable lines because the dampening vibrations of the bridge obscure the detected vibrations of vehicles traversing the bridge.

FIG. 4 is a view of filtered DFOS data 400 in accordance with some embodiments. The filtered DFOS data 400 includes regions 410 that indicate higher vibration intensities within the estimate frequency range. The regions 410 are likely to be bridges along the roadway. The filtered DFOS data 400 also includes regions 420 that indicate lower vibration intensities within the estimated frequency range. The regions 420 are likely to be non-bridge portions of the roadway.

Figure 5A:
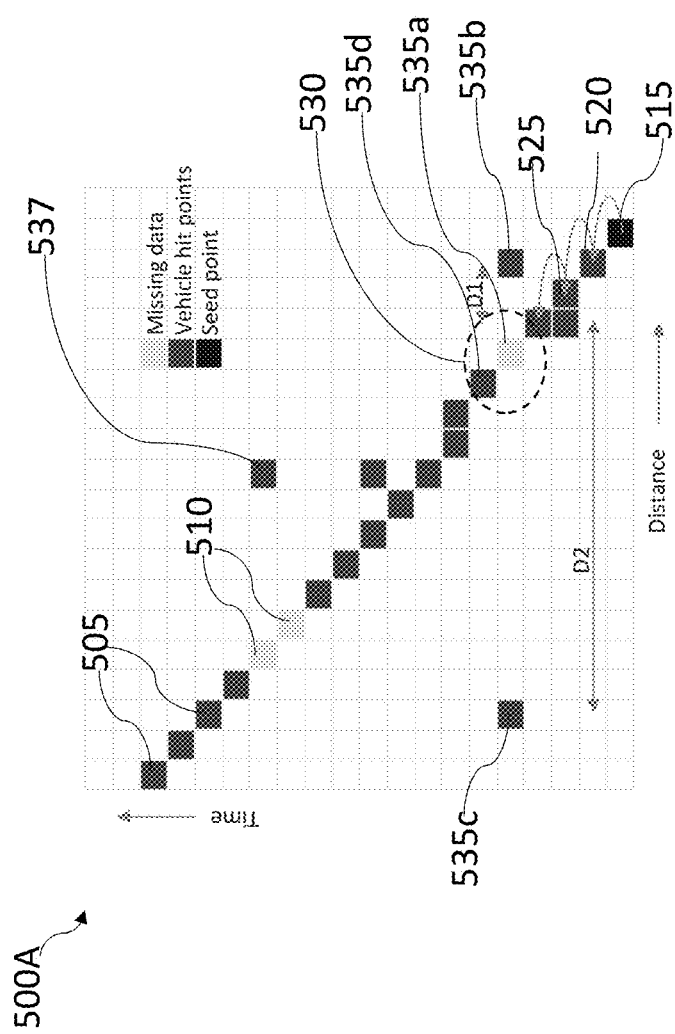
FIG. 5A is a view of a plot of detected vehicle positions based on DFOS data in accordance with some embodiments.

FIG. 5A is a view of a plot 500A of detected vehicle positions based on DFOS data in accordance with some embodiments. The plot 500A includes hit points 505, missing data points 510, and a seed point 515. The plot 500A includes this data in a distance versus time graph. The distance axis is a measure of how far the detected vibration is from the DAS, e.g., DAS 112 (FIG. 1). Thus, the data in plot 500A indicates that a vehicle is traveling toward the DAS because as the time increases the distance decreases. The hit points 505 indicate detected vibrations indicate the presence of a vehicle at the distance away from the DAS at a certain time. The missing data points 510 indicate the lack of an expected hit point based on analysis for tracking the vehicle. The seed point 515 indicates a hit point 505 determined to as the initial seed, e.g., using operation 220 (FIG. 2). The following description includes non-limiting examples of implementation of portions of the method 200 (FIG. 2).

The hit points 505 are detected from DFOS data, e.g., using operations 205, 210 and 215 (FIG. 2). Using the hit points 505, the seed point 515 is determined, e.g., using operation 220 (FIG. 2). Once the seed point 515 is determined, subsequent hit points 520 and 525 are identified, e.g., using operation 225 (FIG. 2). Subsequent hit points 520 and 525 are hit point points 505 detected at a time later than the seed point 515. Only subsequent hit points 520 and 525 are labeled in plot 500A; however, one of ordinary skill in the art would recognize that plot 500A includes more subsequent hit points than just subsequent hit points 520 and 525.

At region 530 of the plot 500A a missing data point 535a is at a position where a subsequent hit point would be expected. At a same time as the missing data point 535a, a first hit point 535b and a second hit point 535c are detected. In order to determine whether either of the first hit point 535b or the second hit point 535c is attributable to the vehicle associated with seed point 515, a determination is made regarding whether either of the first hit point 535b or the second hit point 535c is an outlier hit point, e.g., using operation 530 (FIG. 2).

In order to determine whether the first hit point 535b is an outlier hit point, the location of the first hit point 535b is compared with the location of the missing data point 535a. That is, the location of the expected subsequent hit point corresponding to the missing data point 535a and the first hit point 535b are analyzed to determine whether reasonable movement of the vehicle could account of a difference between these two locations. The first hit point 535b is a distance D1 away from the missing data point 535a. In some embodiments, the distance D1 is compared with a threshold value or using another option discussed above with respect to operation 230 (FIG. 2). In the example of plot 500A, the first hit point 535b indicates that the vehicle would have to have rapidly changed directions twice in order to be detected at both the subsequent hit point 525 occurring prior to the first hit point 535b and a third hit point 535d occurring after the first hit point 535b. Since the two rapid direction changes are highly unlikely in such a short time period, the first hit point 535b is determined to be an outlier hit point. As a result, even if the distance D1 is within the threshold value, the rapid direction changes indicate that the reasonableness of the first hit point 535b is sufficiently low to indicate that the first hit point 535b is an outlier hit point. Therefore, the first hit point 535b is not considered for analysis of the plot 500A with respect to the tracked vehicle.

In order to determine whether the second hit point 535c is an outlier hit point, the location of the second hit point 535c is compared with the location of the missing data point 535a. That is, the location of the expected subsequent hit point corresponding to the missing data point 535a and the second hit point 535c are analyzed to determine whether reasonable movement of the vehicle could account of a difference between these two locations. The second hit point 535c is a distance D2 away from the missing data point 535a. In some embodiments, the distance D2 is compared with a threshold value or using another option discussed above with respect to operation 230 (FIG. 2). The magnitude of the distance D2 indicates that the second hit point 535c is highly unlikely to correspond to the tracked vehicle. For example, the change in speed of the vehicle to move from the subsequent hit point 525 to the second hit point 535c is so large that the second hit point 535c could not reasonably correspond to the same vehicle as that tracked from seed point 515 through the subsequent hit points 520 and 525. Further, in the example of plot 500A, the second hit point 535c indicates that the vehicle would have to have rapidly changed directions twice in order to be detected at both the subsequent hit point 525 occurring prior to the second hit point 535c and the third hit point 535d occurring after the second hit point 535c. Since the two rapid direction changes are highly unlikely in such a short time period, the second hit point 535c is further determined to be an outlier hit point. Therefore, the second hit point 535c is not considered for analysis of the plot 500A with respect to the tracked vehicle.

One of ordinary skill in the art would understand that the above described analysis of the plot 500A is merely exemplary to assist with understanding some embodiments of the method 200 (FIG. 2) or other methods of analyzing DFOS data; and that the analysis of DFOS data within this description is not limited to only the above analysis example.

Figure 5B:
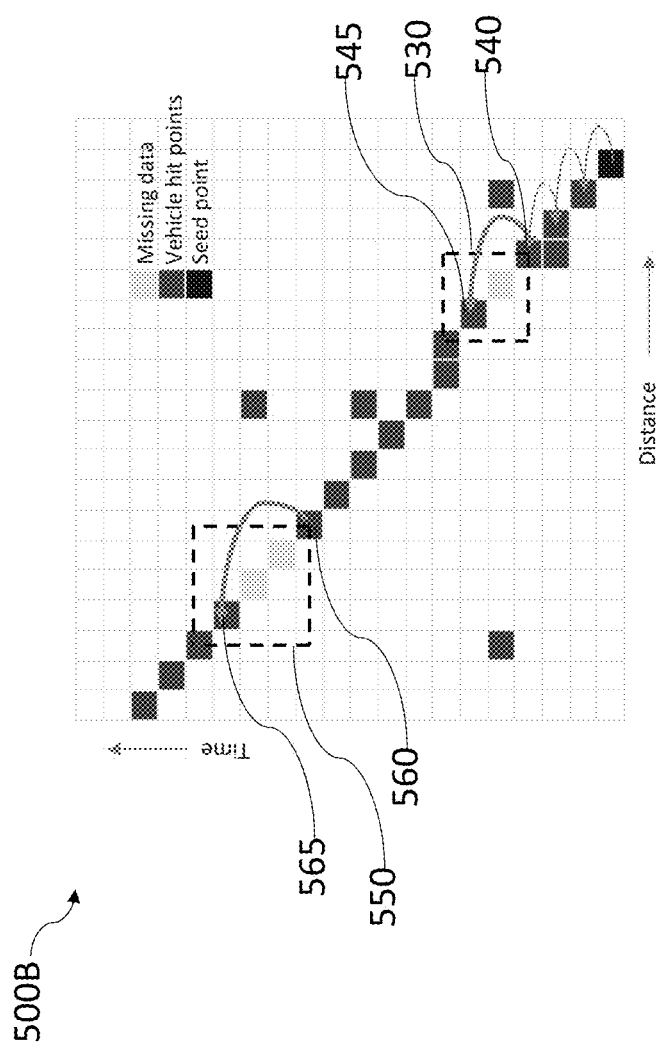
FIG. 5B is a view of a plot of detected vehicle positions based on DFOS data in accordance with some embodiments.

FIG. 5B is a view of a plot 500B of detected vehicle positions based on DFOS data in accordance with some embodiments. The plot 500B is similar to the plot 500A. Several of the hit points and missing data points labeled in plot 500A are not labeled in the plot 500B for clarity of the drawing. Since the detected hit points at the same time as the missing data point within the region 530 were all determined to be outlier hit points, as described above, no detected hit point was identified as a reasonable candidate for replacing the missing data point within the region 530.

In some embodiments where the identified subsequent hit points, e.g., subsequent hit points 520 and 525 (FIG. 5A), are not sufficient to perform clustering, the missing data point within the region 530 is skipped. For example, if operation 235 (FIG. 2) indicates an insufficient number of hit points for clustering, the method 200 returns to operation 225 (FIG. 2). However, since the missing data within region 530 is between a subsequent hit point 540 and another subsequent hit point 545, the missing data is skipped in the iterative performance of the operation 225 (FIG. 2), in some embodiments. Therefore, a determination of whether a sufficient number of hit points is available for clustering, e.g., operation 235 (FIG. 2), is performed without considering the missing data point in the region 530.

The missing data point in the region 530 includes a missing data point at a single time measurement. However, a similar analysis as that described above with respect to plot 500B and plot 500A (FIG. 5A), is applicable to the region 550 which includes multiple consecutive missing data points. Multiple consecutive missing data points are two or more consecutive time periods where no hit points were detected at expected locations. In response to a determination that there are no suitable candidates to replace the missing data points within the region 550, the identification of subsequent hit points will skip from subsequent hit point 560 to subsequent hit point 565.

One of ordinary skill in the art would understand that the above described analysis of the plot 500B is merely exemplary to assist with understanding some embodiments of the method 200 (FIG. 2) or other methods of analyzing DFOS data; and that the analysis of DFOS data within this description is not limited to only the above analysis example.

Figure 6:
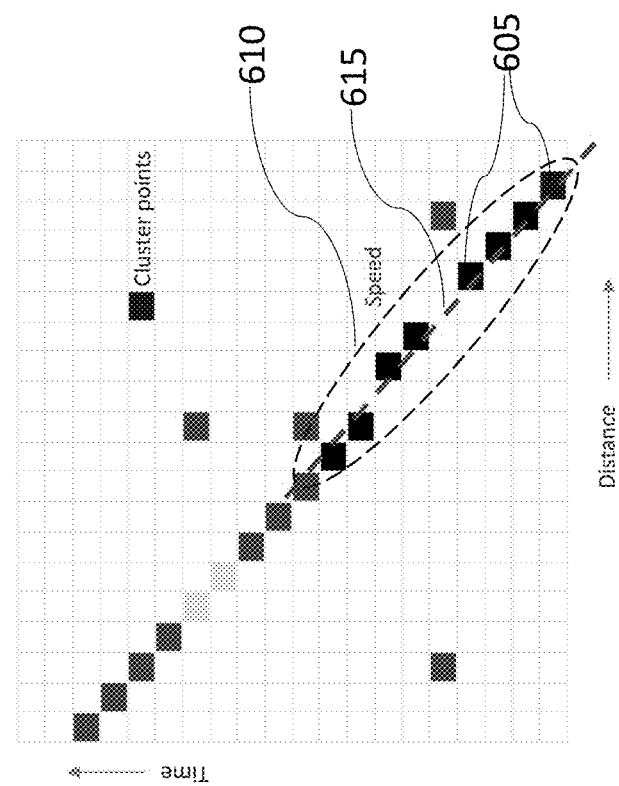
FIG. 6 is a view of a plot of clustered vehicle positions based on DFOS data in accordance with some embodiments.

FIG. 6 is a view of a plot 600 of clustered vehicle positions based on DFOS data in accordance with some embodiments. The plot 600 is similar to the plot 500A (FIG. 5A) and the plot 500B (FIG. 5B). Several of the hit points and missing data points labeled in plot 500A or plot 500B are not labeled in the plot 600 for clarity of the drawing. The plot 600 includes a plurality of clustered hit points 605 to form a cluster 610. A vehicle parameter line 615 is determined based on the clustered hit points 605. A slope of the vehicle parameter line 615 is usable to determine a speed of the vehicle for a duration of the clustered hit points 605.

In some embodiments, the plot 600 indicates DFOS data following operation 240 (FIG. 2). In some embodiments, the plot 600 indicates DFOS data analyzed using a method other than the method 200 (FIG. 2). The cluster 610 does not include a cluster hit point 605 at every detection time along the y-axis of the plot 600. For example, in some embodiments, the cluster 610 is free of a cluster hit point 605 where the missing data 535a (FIG. 5A) was in the plot 500A. The cluster 610 was generated once a sufficient number of cluster hit points 605 were identified. For example, once the operation 235 (FIG. 2) was satisfied, the cluster 610 was formed, in some embodiments.

The vehicle parameter line 615 is determined based on a linear regression of the cluster hit points 605. In some embodiments, the vehicle parameter line 615 is determined based on an algorithm other than linear regression. In some embodiments, the vehicle parameter line 615 is determined using a trained NN. The vehicle parameter line 615 indicates a speed of the vehicle during the time period of the clustered hit points 605.

One of ordinary skill in the art would understand that the above described analysis of the plot 600 is merely exemplary to assist with understanding some embodiments of the method 200 (FIG. 2) or other methods of analyzing DFOS data; and that the analysis of DFOS data within this description is not limited to only the above analysis example.

Figure 7:
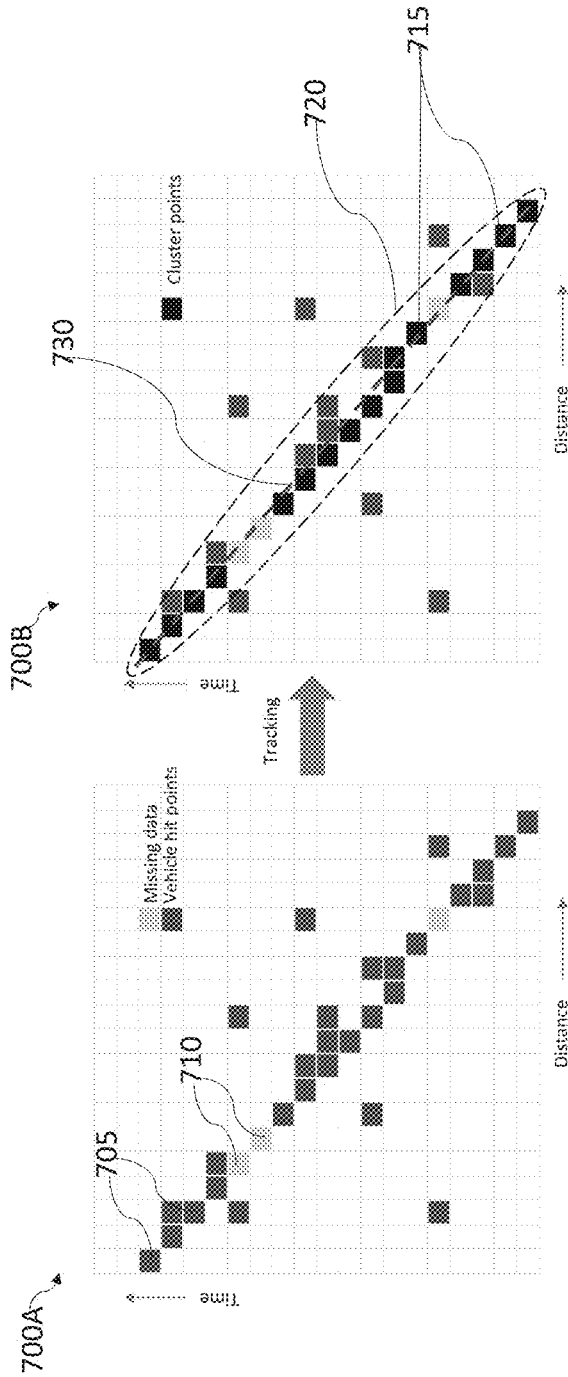
FIG. 7 is a view of plots for tracking a vehicle position along a roadway in accordance with some embodiments.

FIG. 7 is a view of plots 700A and 700B for tracking a vehicle position along a roadway in accordance with some embodiments. The plot 700A is similar to the plot 500A (FIG. 5A) but with different DFOS data populating the plot 700A in comparison with the plot 500A. The plot 700B is similar to the plot 600 (FIG. 6) but with a larger cluster 720 in comparison with the plot 600.

The plot 700A includes a plurality of hit points 705 and a plurality of missing data points 710. The hit points 705 indicate detected vibrations indicate the presence of a vehicle at the distance away from the DAS at a certain time. The missing data points 710 indicate the lack of an expected hit point based on analysis for tracking the vehicle. The hit points 705 are detected from DFOS data, e.g., using operations 205, 210 and 215 (FIG. 2).

The plot 700B includes a plurality of clustered hit points 715 to form a cluster 720. A vehicle parameter line 730 is determined based on the clustered hit points 715. A slope of the vehicle parameter line 730 is usable to determine a speed of the vehicle for a duration of the clustered hit points 715.

The plot 700B is generated by analyzing the DFOS data in the plot 700A for tracking a vehicle. The hit points 705 are analyzed to determine which hit points accurately reflect movement of the vehicle; and which hit points are outlier hit points. The hit points 705 are clustered into clustered hit point 715 once a sufficient number of hit points 705 are identified. An analysis of the cluster 720 is usable to determine a speed of the tracked vehicle using a slope of the vehicle parameter line 730. In some embodiments, the plot 700B is generated by performing the method 200 (FIG. 2) on the DFOS data in the plot 700A. In some embodiments, a tracking method other than the method 200 (FIG. 2) is utilized to generate the plot 700B based on the DFOS data in the plot 700A.

One of ordinary skill in the art would understand that the above described analysis of the plots 700A and 700B are merely exemplary to assist with understanding some embodiments of the method 200 (FIG. 2) or other methods of analyzing DFOS data; and that the analysis of DFOS data within this description is not limited to only the above analysis example.

Figure 8:
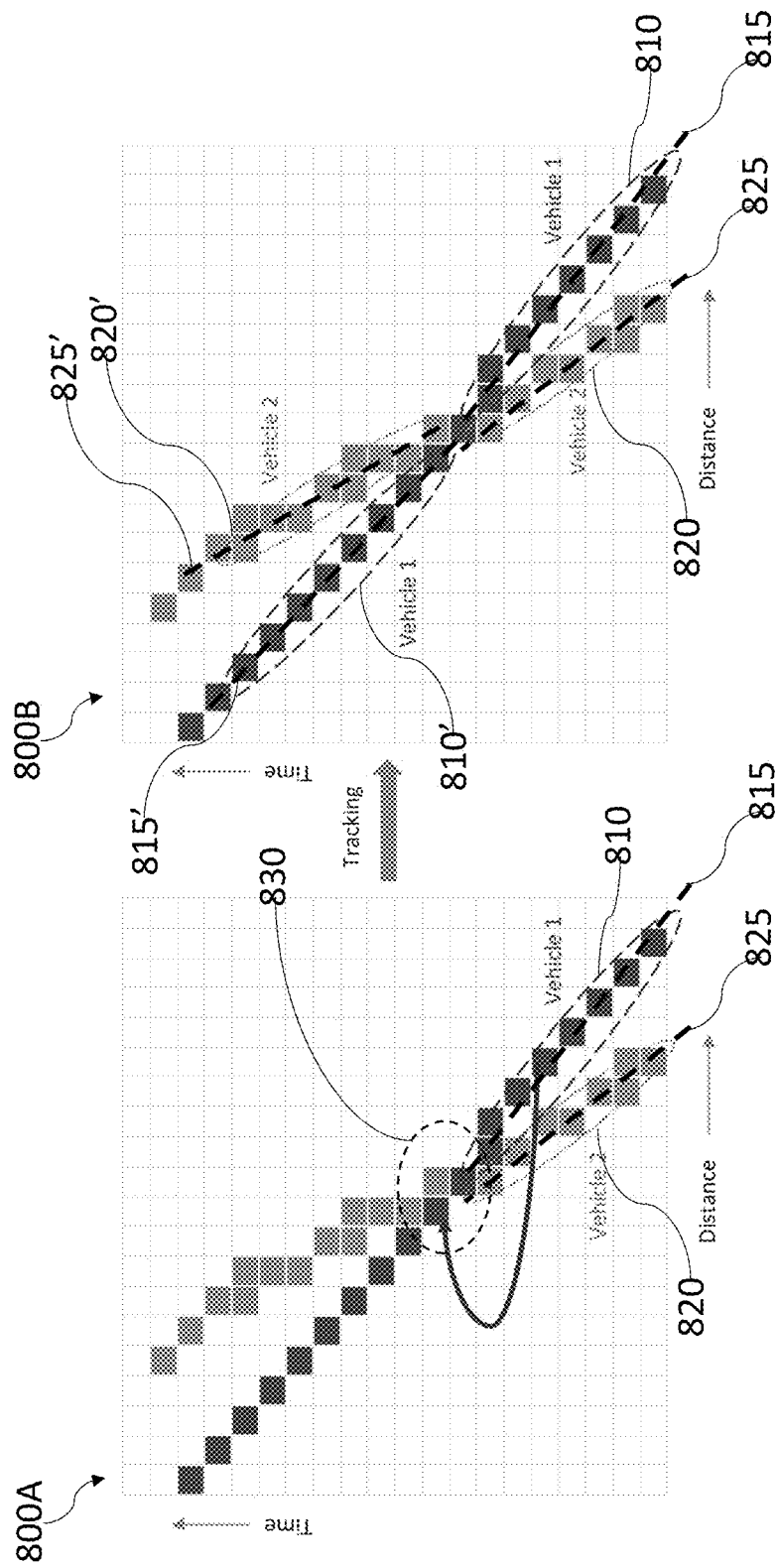
FIG. 8 is a view of plots for tracking multiple vehicles along a roadway in accordance with some embodiments.

FIG. 8 is a view of plots 800A and 800B for tracking multiple vehicles along a roadway in accordance with some embodiments. Similar to plots 700A and 700B (FIG. 7), the plots 800A and 800B include hit points. In contrast to the plots 700A and 700B (FIG. 7), the plots 800A and 800B include hit points for multiple vehicles. Plots 800A and 800B do not include missing data points or outlier hit points for the sake of clarity of the drawing. However, one of ordinary skill in the art would recognize that the inclusion of missing data points and outlier hit points in plots for multiple vehicles are within the scope of this description.

The plot 800A includes a first cluster 810 of hit points and a second cluster 820 of hit points. The first cluster 810 corresponds to hit points for a first vehicle. The second cluster 820 corresponds to hit points for a second vehicle. One of ordinary skill in the art would understand that tracking more than two vehicles using DFOS data is within the scope of this description. In some embodiments, the first cluster 810 and the second cluster 820 are determined using the method 200 (FIG. 2). In some embodiments, at least one of the first cluster 810 or the second cluster 820 is determined using a method other than the method 200 (FIG. 2). The first cluster 810 intersects the second cluster 820 at an intersection 830. The intersection 830 is a position in the plot 800A where the hit points for multiple vehicles cross one another, and does not correspond to an intersection in a roadway. In some embodiments, the intersection 830 is generated by one vehicle passing another, by a vehicle changing lanes, or another suitable situation. The close proximity of hit points for each of the vehicles increases a difficulty of tracking each of the first vehicle and the second vehicle separately following the intersection 830.

Utilizing a vehicle tracking method, such as method 200 (FIG. 2), helps to improve tracking of multiple vehicles through an intersection 830. Determining the first cluster 810 and determining a vehicle parameter line 815 for the first cluster 810 provides a speed of the first vehicle through a duration of the first cluster 810. Similarly, determining the second cluster 820 and determining a vehicle parameter line 825 for the second cluster 820 provides a speed of the second vehicle through a duration of the second cluster 820.

Once the first cluster 810 and the second cluster 820 are determined on a first size of the intersection 830, seed points are identified on a second side of the intersection 830, opposite to the first side of the intersection 830. One seed point is determined for each of the vehicles being tracked in the plots 800A and 800B. Using a vehicle tracking method, such as method 200 (FIG. 2), clusters are determined using the newly identified seed points on the second side of the intersection 830. The plot 800B includes a third cluster 810' determined using one seed point on the second side of the intersection 830. The plot 800B further includes a fourth cluster 820' determined using another seed point on the second side of the intersection 830. A vehicle parameter line 815' is determined using the third cluster 810'; and a vehicle parameter line 825' is determined using the fourth cluster 820'.

In order to track each of the multiple vehicles through the intersection 830, the vehicle parameter line 815' is compared with each of the vehicle parameter line 815 and the vehicle parameter line 825. The vehicle parameter line 815' is determined to correspond to the vehicle associated with the vehicle parameter line having a most similar slope as the vehicle parameter line 815'. Similarly, the vehicle parameter line 825' is compared with each vehicle parameter line 815 and vehicle parameter line 825 to determine which vehicle corresponds to the vehicle parameter line 825'. In the case of plot 800B, the vehicle parameter line 815' has a slope most similar to the vehicle parameter line 815. Therefore, the vehicle parameter line 815' is determined to correspond to the first vehicle. Similarly, the vehicle parameter line 825' has a slope most similar to the vehicle parameter line 825; and the vehicle parameter line 825' is determined to correspond to the second vehicle. In some embodiments, once a vehicle is determined to correspond to a vehicle parameter line on each side of the intersection 830, all vehicle parameter lines corresponding to that vehicle are excluded from further comparisons related to the intersection 830 to reduce processing load.

By applying a tracking method, such as the method 200 (FIG. 2), to hit points on both sides of an intersection, multiple vehicles are able to be precisely and accurately tracked using DFOS data.

Figure 9:
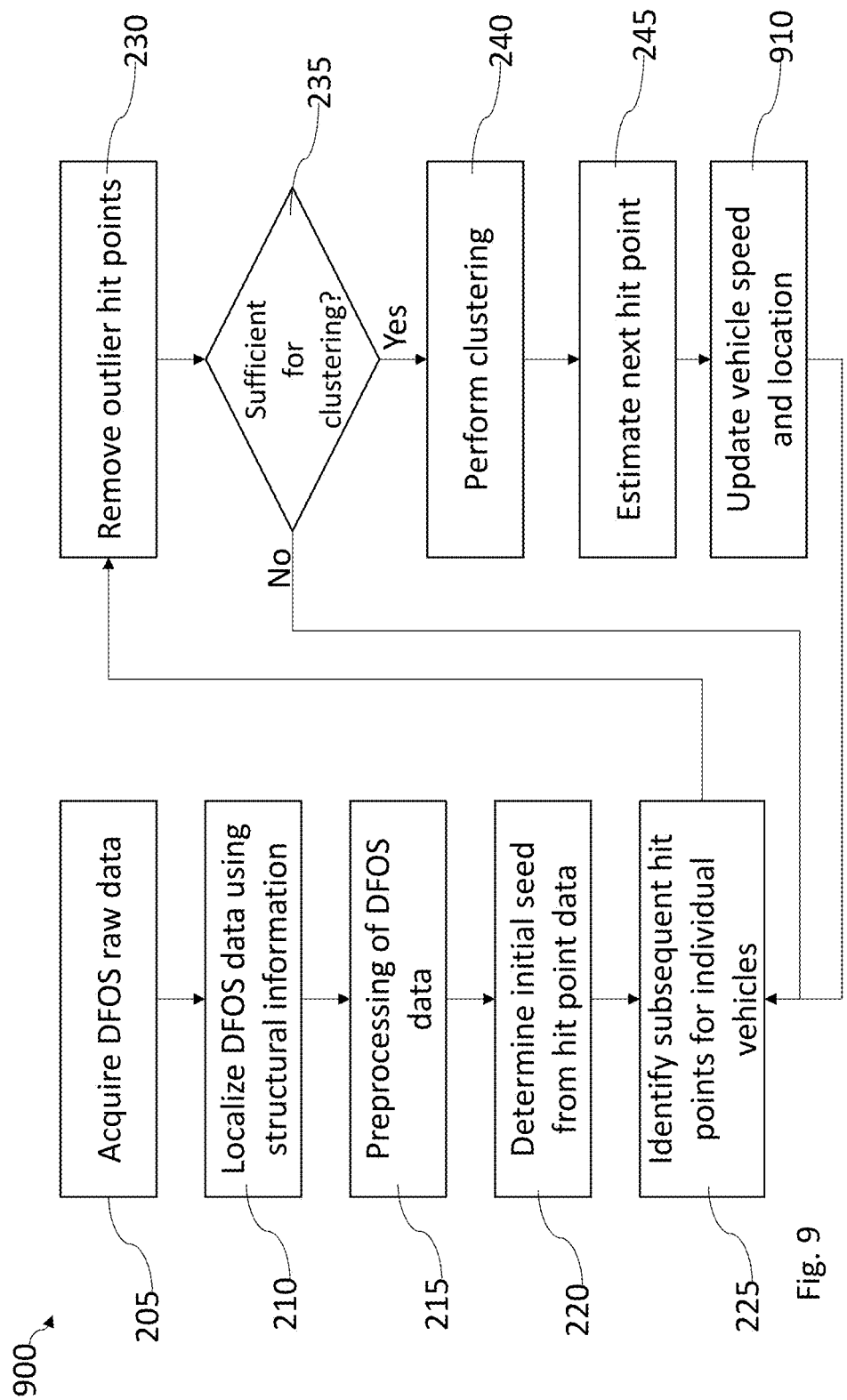
FIG. 9 is a flowchart of a method of analyzing distributed fiber optic sensing (DFOS) data in accordance with some embodiments.

FIG. 9 is a flowchart of a method 900 of analyzing distributed fiber optic sensing (DFOS) data in accordance with some embodiments. The method 900 is usable in combination with the method 200 (FIG. 2). The method 900 is further usable independent of the method 200 (FIG. 2). The method 900 is usable to implement the functionality as discussed above with respect to the plot 500A (FIG. 5A); the plot 500B (FIG. 5B); the plot 600 (FIG. 6); the plots 700A and 700B (FIG. 7); and the plots 800A and 800B (FIG. 8). The method 900 is also usable to implement functionality other than that discussed above with respect to the various plots.

The method 900 is similar to the method 200 (FIG. 2) and similar operations have a same reference number as the method 200. In comparison with the method 200 (FIG. 2), the method 900 includes operation 910 in which the tracked vehicle speed and vehicle location are updated. The updating of the vehicle location is based on a most recent detected hit point that is not an outlier hit point. In some embodiments, the most recent detected hit point corresponds to a detected hit point that matches an estimated next hit point from operation 245. The updating of the vehicle speed is based on an analysis of clustered hit points, such as discussed above with respect to plot 600 (FIG. 6).

In some embodiments, the method 900 includes additional operations. For example, in some embodiments, the method 900 includes generating instructions for controlling an autonomously driven vehicle based on the estimated vehicle parameter. In some embodiments, at least one operation of the method 900 is omitted. For example, in some embodiments, the operation 245 is omitted and no estimation of hit points is performed. In some embodiments, an order of operations of the method 900 is adjusted. For example, in some embodiments, the operation 215 is performed prior to the operation 210.

Using the method 900, the DFOS data is usable to increase precision and accuracy of tracking a vehicle along a roadway in comparison with other approaches that fail to remove outlier hit points and cluster hit points. The improved determination of vehicle tracking helps to improve the accuracy of traffic monitoring, navigation instructions, autonomous driving instructions and other applications.

Figure 10:
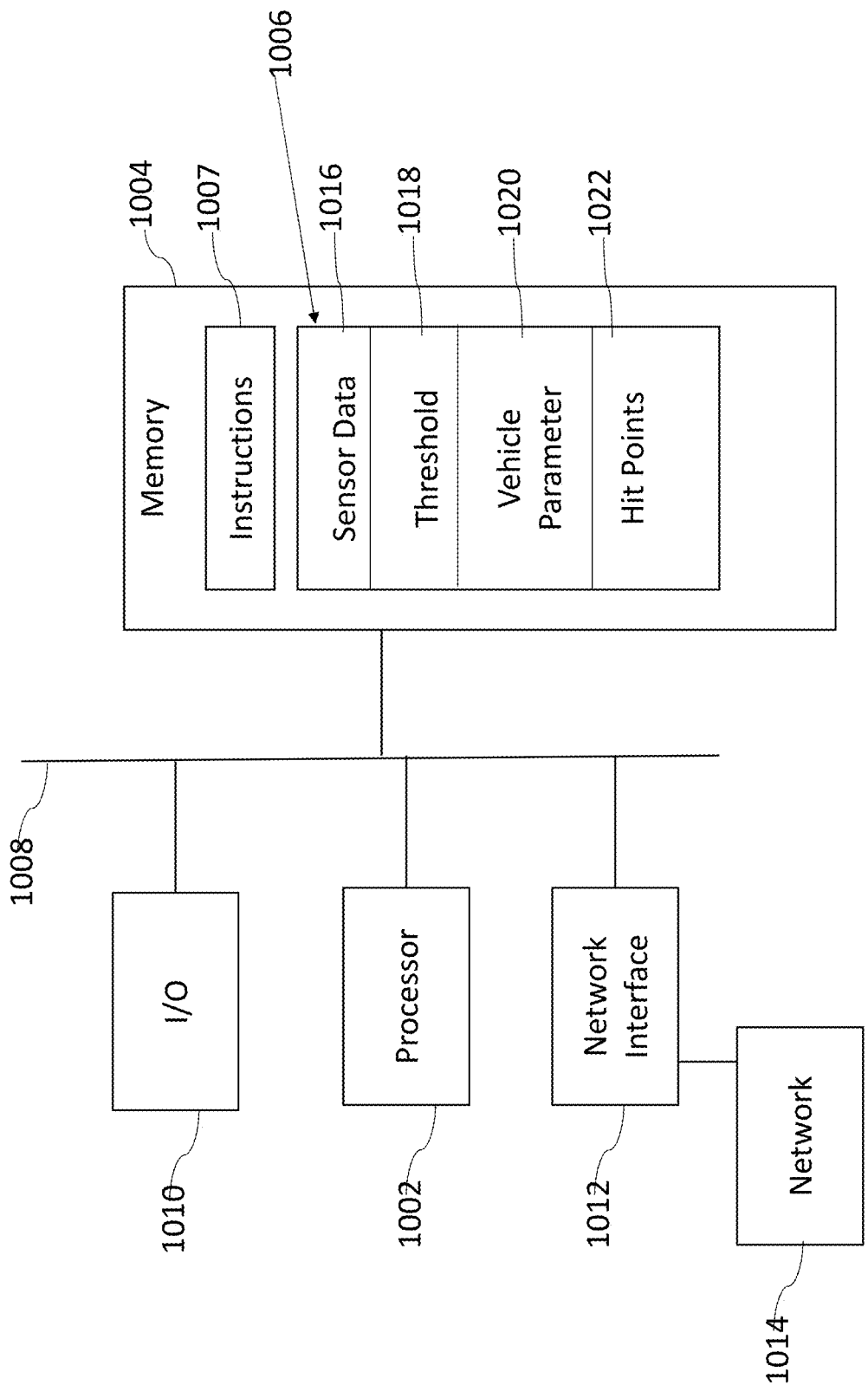
FIG. 10 is a block diagram of a system for analyzing DFOS data in accordance with some embodiments.

FIG. 10 is a block diagram of a system 1000 for analyzing DFOS data in accordance with some embodiments. System 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with external devices. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 100 to be usable for performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data. In some embodiments, the storage medium 1004 also stores information needed for performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data as well as information generated during performing a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data, such as a sensor data parameter 1016, a threshold parameter 1018, a vehicle parameter 1020, a hit points parameter 1022 and/or a set of executable instructions to perform a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

In some embodiments, the storage medium 1004 stores instructions 1007 for interfacing with external devices. The instructions 1007 enable processor 1002 to generate instructions readable by the external devices to effectively implement a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described with respect to the DAS system 100A (FIG. 1A), the DAS system 100B (FIG. 1B), the method 200 (FIG. 2), the method 900 (FIG. 9), or another suitable system for analyzing DFOS data is implemented in two or more systems 1000, and information such as sensor data, bridge location, frequency range and extra fiber portions are exchanged between different systems 1000 via network 1014.

System 1000 is configured to receive information related to a DFOS data through I/O interface 1010 or network interface 1012. The DFOS data is transferred to processor 1002 via bus 1008 for estimation of a frequency range and preprocess and/or filtering. The frequency range is stored in the computer readable medium 1004 as the frequency ranges parameter 1020. In some embodiments, the estimated frequency range parameter 1020 is received through the I/O 1010 or the network interface 1012. The preprocessed DFOS data is then stored in computer readable medium 1004 as sensor data parameter 1016. The processor 1002 retrieves the sensor data parameter 1016 from the computer readable medium 1004 and hit points for the hit points parameter 1022. The processor 1002 performs iterative de-noising of the hit points parameter 1022, such as using the threshold parameter 1018. The processor 1002 performs analysis of good clusters remaining following the iterative de-noising to determine vehicle parameters for the vehicle parameter 1020. In some embodiments, the system 1000 is usable to implement a trained NN usable to effectively implement a portion or all of the operations as described with respect to the DAS system 100A (FIG. 1A), the DAS system 100B (FIG. 1B), the method 200 (FIG. 2), the method 900 (FIG. 9), or another suitable processes for analyzing DFOS data.

Supplemental Note 1

A vehicle tracking method includes receiving distributed optical fiber sensing (DFOS) data. The method further includes identifying first hit points within the DFOS data, wherein each of the first hit points corresponds to a location of a corresponding first vehicle at a detection time. The method further includes determining an initial seed point from among the identified first hit points. The method further includes determining whether any of the identified first hit points is an outlier hit point. The method further includes clustering the identified first hit points exclusive of any outlier hit point to define a first cluster. The method further includes estimating a first vehicle parameter of the first vehicle based on the first cluster.

Supplemental Note 2

The vehicle tracking method of Supplemental Note 1, wherein determining whether any of the identified first hit points is the outlier hit point includes analyzing a first hit point in question to determine whether the first vehicle could reasonably travel from a confirmed first hit point prior to the first hit point in question; and determining the first hit point in question is the outlier hit point in response to a determination that the first vehicle would be unable to reasonably travel from the confirmed first hit point to the first hit point in question.

Supplemental Note 3

The vehicle tracking method of Supplemental Note 2, wherein analyzing the first hit point in question comprises analyzing the first hit point in question based on a determined speed of the first vehicle.

Supplemental Note 4

The vehicle tracking method of Supplemental Note 2, wherein analyzing the first hit point in question comprises analyzing the first hit point in question based on parameters of a roadway along which the first vehicle travels.

Supplemental Note 5

The vehicle tracking method of Supplemental Note 1, further including determining whether a sufficient number of the first hit points is identified for clustering, wherein the clustering the identified first hit points is performed in response to a determination that the sufficient number of the first hit points is identified.

Supplemental Note 6

The vehicle tracking method of Supplemental Note 5, further includes identifying at least one subsequent first hit point from the DFOS data in response to a determination that an insufficient number of first hit points is identified.

Supplemental Note 7

The vehicle tracking method of Supplemental Note 1, further including identifying second hit points within the DFOS data, wherein each of the second hit points corresponds to a location of a corresponding second vehicle; estimating a second vehicle parameter of the second vehicle based on the identified second hit points; and plotting the identified first hit points and the identified second hit points, wherein the plotted identified first hit points intersects the plotted identified second hit points at an intersection.

Supplemental Note 8

The vehicle tracking method of Supplemental Note 7, further includes tracking each of the first vehicle and the second vehicle across the intersection based on the first vehicle parameter and the second vehicle parameter.

Supplemental Note 9

A vehicle tracking system includes a non-transitory computer readable medium configured to store instructions thereon; and a processor connected to the non-transitory computer readable medium. The processor is configured to execute the instructions for receiving distributed optical fiber sensing (DFOS) data. The processor is further configured to execute the instructions for identifying first hit points within the DFOS data, wherein each of the first hit points corresponds to a location of a corresponding first vehicle at a detection time. The processor is further configured to execute the instructions for determining an initial seed point from among the identified first hit points. The processor is further configured to execute the instructions for determining whether any of the identified first hit points is an outlier hit point. The processor is further configured to execute the instructions for clustering the identified first hit points exclusive of any outlier hit point to define a first cluster. The processor is further configured to execute the instructions for estimating a first vehicle parameter of the first vehicle based on the first cluster.

Supplemental Note 10

The vehicle tracking system of Supplemental Note 9, wherein the processor is further configured to execute the instructions for determining whether any of the identified first hit points is the outlier hit point by analyzing a first hit point in question to determine whether the first vehicle could reasonably travel from a confirmed first hit point prior to the first hit point in question; and determining the first hit point in question is the outlier hit point in response to a determination that the first vehicle would be unable to reasonably travel from the confirmed first hit point to the first hit point in question.

Supplemental Note 11

The vehicle tracking system of Supplemental Note 10, wherein the processor is further configured to execute the instructions for analyzing the first hit point in question based on a determined speed of the first vehicle.

Supplemental Note 12

The vehicle tracking system of Supplemental Note 10, wherein the processor is configured to execute the instructions for analyzing the first hit point in question based on parameters of a roadway along which the first vehicle travels.

Supplemental Note 13

The vehicle tracking system of Supplemental Note 9, wherein the processor is configured to execute the instructions for determining whether a sufficient number of the first hit points is identified for clustering, and clustering the identified first hit points is performed in response to a determination that the sufficient number of the first hit points is identified.

Supplemental Note 14

The vehicle tracking system of Supplemental Note 13, wherein the processor is configured to execute the instructions for identifying at least one subsequent first hit point from the DFOS data in response to a determination that an insufficient number of first hit points is identified.

Supplemental Note 15

The vehicle tracking system of Supplemental Note 9, wherein the processor is further configured to execute the instructions for identifying second hit points within the DFOS data, wherein each of the second hit points corresponds to a location of a corresponding second vehicle; estimating a second vehicle parameter of the second vehicle based on the identified second hit points; and plotting the identified first hit points and the identified second hit points, wherein the plotted identified first hit points intersects the plotted identified second hit points at an intersection.

Supplemental Note 16

The vehicle tracking system of Supplemental Note 15, wherein the processor is further configured to execute the instructions for tracking each of the first vehicle and the second vehicle across the intersection based on the first vehicle parameter and the second vehicle parameter.

Supplemental Note 17

A non-transitory computer readable medium configured to store instructions thereon for causing a processor to receive distributed optical fiber sensing (DFOS) data. The instructions further cause the processor to identify first hit points within the DFOS data, wherein each of the first hit points corresponds to a location of a corresponding first vehicle at a detection time. The instructions further cause the processor to determine an initial seed point from among the identified first hit points. The instructions further cause the processor to determine whether any of the identified first hit points is an outlier hit point. The instructions further cause the processor to cluster the identified first hit points exclusive of any outlier hit point to define a first cluster. The instructions further cause the processor to estimate a first vehicle parameter of the first vehicle based on the first cluster.

Supplemental Note 18

The non-transitory computer readable medium of Supplemental Note 17, wherein the instructions are further configured to cause the processor to determining whether any of the identified first hit points is the outlier hit point by analyzing a first hit point in question to determine whether the first vehicle could reasonably travel from a confirmed first hit point prior to the first hit point in question; and determining the first hit point in question is the outlier hit point in response to a determination that the first vehicle would be unable to reasonably travel from the confirmed first hit point to the first hit point in question.

Supplemental Note 19

The non-transitory computer readable medium of Supplemental Note 17, wherein the instructions are further configured to cause the processor to determine whether a sufficient number of the first hit points is identified for clustering, and cluster the identified first hit points is performed in response to a determination that the sufficient number of the first hit points is identified.

Supplemental Note 20

The non-transitory computer readable medium of Supplemental Note 17, wherein the instructions are further configured to cause the processor to identify second hit points within the DFOS data, wherein each of the second hit points corresponds to a location of a corresponding second vehicle; estimate a second vehicle parameter of the second vehicle based on the identified second hit points; plot the identified first hit points and the identified second hit points, wherein the plotted identified first hit points intersects the plotted identified second hit points at an intersection; and track each of the first vehicle and the second vehicle across the intersection based on the first vehicle parameter and the second vehicle parameter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle tracking method comprising:
    receiving distributed optical fiber sensing (DFOS) data;
    identifying first hit points within the DFOS data, wherein each of the first hit points corresponds to a location of a corresponding first vehicle at a detection time;
    determining an initial seed point from among the identified first hit points;
    determining whether any of the identified first hit points is an outlier hit point;
    clustering the identified first hit points exclusive of any outlier hit point to define a first cluster;
    estimating a first vehicle parameter of the first vehicle based on the first cluster;
    identifying second hit points within the DFOS data, wherein each of the second hit points corresponds to a location of a corresponding second vehicle;
    estimating a second vehicle parameter of the second vehicle based on the identified second hit points; and
    plotting the identified first hit points and the identified second hit points, wherein the plotted identified first hit points intersects the plotted identified second hit points at an intersection.

2. The vehicle tracking method of claim 1, wherein determining whether any of the identified first hit points is the outlier hit point comprises:
    analyzing a first hit point in question to determine whether the first vehicle could reasonably travel from a confirmed first hit point prior to the first hit point in question; and
    determining the first hit point in question is the outlier hit point in response to a determination that the first vehicle would be unable to reasonably travel from the confirmed first hit point to the first hit point in question.

3. The vehicle tracking method of claim 2, wherein analyzing the first hit point in question comprises analyzing the first hit point in question based on a determined speed of the first vehicle.

4. The vehicle tracking method of claim 2, wherein analyzing the first hit point in question comprises analyzing the first hit point in question based on parameters of a roadway along which the first vehicle travels.

5. The vehicle tracking method of claim 1, further comprising determining whether a sufficient number of the first hit points is identified for clustering, wherein the clustering the identified first hit points is performed in response to a determination that the sufficient number of the first hit points is identified.

6. The vehicle tracking method of claim 5, further comprising identifying at least one subsequent first hit point from the DFOS data in response to a determination that an insufficient number of first hit points is identified.

7. The vehicle tracking method of claim 1, further comprising tracking each of the first vehicle and the second vehicle across the intersection based on the first vehicle parameter and the second vehicle parameter.

8. A vehicle tracking system comprising:
    a non-transitory computer readable medium configured to store instructions thereon; and
    a processor connected to the non-transitory computer readable medium, wherein the processor is configured to execute the instructions for:
    receiving distributed optical fiber sensing (DFOS) data;
    identifying first hit points within the DFOS data, wherein each of the first hit points corresponds to a location of a corresponding first vehicle at a detection time;
    determining an initial seed point from among the identified first hit points;
    determining whether any of the identified first hit points is an outlier hit point;
    clustering the identified first hit points exclusive of any outlier hit point to define a first cluster;
    estimating a first vehicle parameter of the first vehicle based on the first cluster;
    identifying second hit points within the DFOS data, wherein each of the second hit points corresponds to a location of a corresponding second vehicle;
    estimating a second vehicle parameter of the second vehicle based on the identified second hit points; and
    plotting the identified first hit points and the identified second hit points, wherein the plotted identified first hit points intersects the plotted identified second hit points at an intersection.

9. The vehicle tracking system of claim 8, wherein the processor is further configured to execute the instructions for determining whether any of the identified first hit points is the outlier hit point by:
    analyzing a first hit point in question to determine whether the first vehicle could reasonably travel from a confirmed first hit point prior to the first hit point in question; and
    determining the first hit point in question is the outlier hit point in response to a determination that the first vehicle would be unable to reasonably travel from the confirmed first hit point to the first hit point in question.

10. The vehicle tracking system of claim 9, wherein the processor is further configured to execute the instructions for analyzing the first hit point in question based on a determined speed of the first vehicle.

11. The vehicle tracking system of claim 9, wherein the processor is configured to execute the instructions for analyzing the first hit point in question based on parameters of a roadway along which the first vehicle travels.

12. The vehicle tracking system of claim 8, wherein the processor is configured to execute the instructions for:
determining whether a sufficient number of the first hit points is identified for clustering, and clustering the identified first hit points is performed in response to a determination that the sufficient number of the first hit points is identified.

13. The vehicle tracking system of claim 12, wherein the processor is configured to execute the instructions for identifying at least one subsequent first hit point from the DFOS data in response to a determination that an insufficient number of first hit points is identified.

14. The vehicle tracking system of claim 8, wherein the processor is further configured to execute the instructions for tracking each of the first vehicle and the second vehicle across the intersection based on the first vehicle parameter and the second vehicle parameter.

15. A non-transitory computer readable medium configured to store instructions thereon for causing a processor to:
receive distributed optical fiber sensing (DFOS) data;
identify first hit points within the DFOS data, wherein each of the first hit points corresponds to a location of a corresponding first vehicle at a detection time;
determine an initial seed point from among the identified first hit points;
determine whether any of the identified first hit points is an outlier hit point;
cluster the identified first hit points exclusive of any outlier hit point to define a first cluster;
estimate a first vehicle parameter of the first vehicle based on the first cluster;
identify second hit points within the DFOS data, wherein each of the second hit points corresponds to a location of a corresponding second vehicle;
estimate a second vehicle parameter of the second vehicle based on the identified second hit points; and
plot the identified first hit points and the identified second hit points, wherein the plotted identified first hit points intersects the plotted identified second hit points at an intersection.

16. The non-transitory computer readable medium of claim 15, wherein the instructions are further configured to cause the processor to determine whether any of the identified first hit points is the outlier hit point by:
analyzing a first hit point in question to determine whether the first vehicle could reasonably travel from a confirmed first hit point prior to the first hit point in question; and
determining the first hit point in question is the outlier hit point in response to a determination that the first vehicle would be unable to reasonably travel from the confirmed first hit point to the first hit point in question.

17. The non-transitory computer readable medium of claim 15, wherein the instructions are further configured to cause the processor to determine whether a sufficient number of the first hit points is identified for clustering, and cluster the identified first hit points is performed in response to a determination that the sufficient number of the first hit points is identified.

18. The non-transitory computer readable medium of claim 15, wherein the instructions are further configured to cause the processor to:
track each of the first vehicle and the second vehicle across the intersection based on the first vehicle parameter and the second vehicle parameter.

* * * * *